Nov. 13, 1934.  W. G. KENDALL  1,980,921
VANITY CASE
Filed May 11, 1934
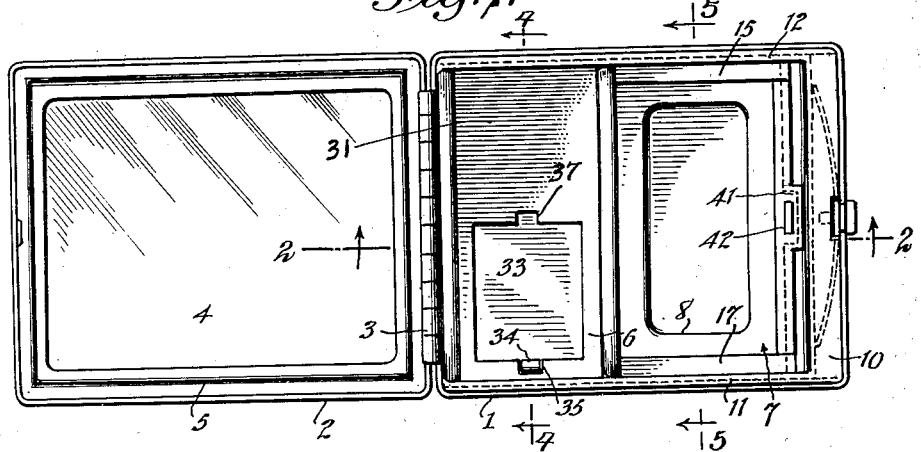
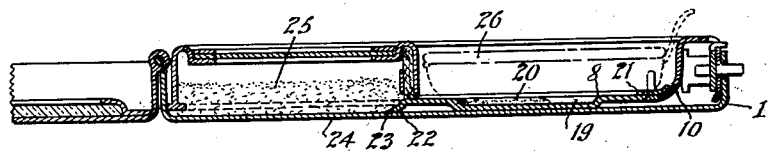
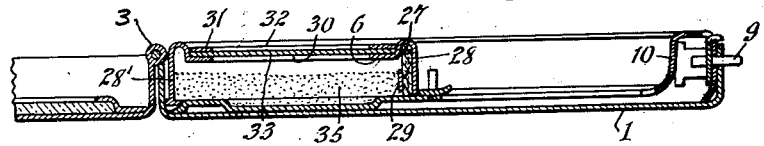
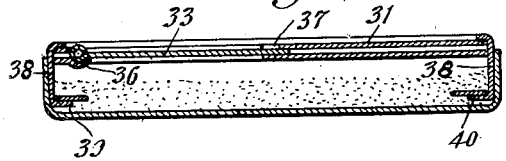 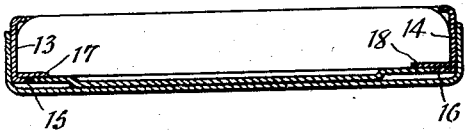
WITNESSES
INVENTOR
William G. Kendall
BY
Munn, Anderson & Liddy
ATTORNEYS Patented Nov. 13, 1934

1,980,921

UNITED STATES PATENT OFFICE 1,980,921

VANITY CASE

William G. Kendall, Maplewood, N. J.

Application May 11, 1934, Serial No. 725,206

3 Claims. (Cl. 132—83)

This invention relates to vanity cases and has for an object to provide an improved construction wherein powder is adapted to be dispensed in very small quantities.

Another object of the invention is to provide a vanity case having a container for powder and a sliding member for dispensing the powder in small quantities and for holding the powder in a dispensing position until taken up by a powder puff or otherwise removed.

Another object, more specifically, is to provide a vanity case having a stationary compartment with a sliding tray arranged to slide underneath the compartment so as to receive powder from the container and transport the same to a position exterior of the compartment whereby only the powder in the sliding tray is accessible.

In the accompanying drawing—

Figure 1 is a plan view of the vanity case disclosing an embodiment of the invention, the same being shown open;

Figure 2 is a sectional view through Figure 1 approximately on the line 2—2, the same being on a somewhat enlarged scale;

Figure 3 is a view similar to Figure 2 but showing the sliding tray in a different position;

Figure 4 is a sectional view through Figure 1 on the line 4—4;

Figure 5 is a sectional view through Figure 1 on the line 5—5.

Referring to the accompanying drawing by numerals, 1 and 2 indicate casing members hingedly connected together by a suitable hinge 3. The casing member 2 is provided with a mirror 4 held in place by a suitable frame 5, which frame may be held in place by friction or other desired means. Arranged in the casing member 1 is a compartment 6 for receiving powder of any kind, while adjacent thereto there is provided a chamber 7 in which a sliding tray 8 is normally positioned but capable of being slid almost completely beneath compartment 6. The casing member 1 is provided with a catch 9 of any desired structure, said catch being covered by the cover plate 10 which merges into side top edge members 11 and 12 as shown in Figure 1. These members are held in the casing member 1 by friction.

As illustrated in Figure 5 the cover plate 10 is not only provided with members 11 and 12 but with depending side members 13 and 14 which merge into inturned shoulders 15 and 16. Side guides 17 and 18 are arranged on top of the inturned flanges 15 and 16 and, if desired, may be welded or otherwise secured thereto. These guides, as shown in Figure 1, extend from member 10 to the container 6 so as to guide the sliding tray 8 as it moves from the position shown in Figure 2, to that shown in Figure 1, and also in a reverse direction. The tray 8 is formed of sheet metal provided with a depression 19 for the reception of a small quantity of powder 20. At the front there is provided a small plate 21 which is curved so as to fit over the depending portion of member 10, as illustrated in Figure 2, while the body of the tray abuts against the end edge of member 10. At the opposite side of the tray there is provided a curved depending portion 22 which has a sharp edge 23 adapted to scrape along the upper surface of the abutment 24 of casing member 1. In this way the powder 25 in the container 6 will be raised and a certain quantity allowed to drop down to the depression 19, as shown in Figure 3. After this has been done the tray is pulled back to the position shown in Figure 2 and the quantity of powder in depression 19 will be vended so that the powder puff 26 may be used or the powder may be dispensed in some other manner.

By having the knife edge 21 no powder can sift therebeneath, while the upper surface of the tray is braced by a felt gasket or flat felt washer 27 so that no powder can pass at this point. The washer or gasket 27 is held by the end 28 of container 6 and by a suitable strap 29 which may be secured to the sides or ends of the container 6 by solder, welding or the like.

The top of the container 6 is provided with an opening 30 and above this opening there is a plate 31 having an opening 32. Between the top of the container 6 and the plate 31 there is a sliding plate 33 which is provided with a resilient turned over end member forming a spring catch 34. This spring catch is adapted to be moved into the notch 35 and to snap into the cup-shaped extension 36. The notch 37 is formed in plate 31 so that when the sliding plate 33 is at either of its extreme positions the spring catch 34 will be out of the way, but when in the position shown in Figures 1 and 4 this spring catch interlocks with member 36 for holding the sliding plate against accidental movement. If desired, the side members 28 and 28' may be welded to parts of the casing member 1 and the ends may be eliminated, but preferably are used as shown in Figure 4, the same being preferably integral with the members 11 and 12 but depending therefrom so as to form the ends 38 of container 6 and inner extending flanges 39 and 40 for receiving part of the guides 17 and 18.

The gudes 17 and 18 are so positioned that they coact with the upper surface of the respective edges of the sliding tray 8 thereby causing a good frictional contact between the sliding tray and the bottom of the casing member 1. This prevents leakage of powder beneath the tray, while the felt cushion 27 acts to prevent any leakage at the top. If desired, after the person has used as much of the powder as is desired, the casing member 1 may be inverted and the remaining loose powder allowed to drop out, thus maintaining the exterior of the vanity case clean and substantially free of powder, so that the powder will be used only when desired at the place desired. The tray 8 is provided with a slight extension 41 which overlaps the end 10 as shown in Figure 2, and with an upstanding member 42, whereby the tray may be moved back and forth readily guided by the guide members 17 and 18.

I claim:

1. A vanity case of the character described, including a casing having a stationary container arranged therein, said container along one edge being spaced above the bottom of said casing, a pair of guiding members, and a sliding tray arranged beneath said guiding members, the tray at one edge being beveled and positioned to fit snugly against the bottom of the casing, whereby as it moves into the container it will raise all the powder therein, said tray being adapted to be removed to a point where most of the tray is positioned exterior of the container while still remaining in the casing.

2. A vanity case of the character described, including a casing comprising two compartments, one compartment being open at the top while the other is formed as a container with a slot in one wall thereof, a tray arranged in the casing and slidable through said slot, said tray being of a size to slide through said slot and fit beneath the container with a portion extending therebeyond, said tray having a depressed portion whereby whenever the same is forced through said slot into the container and then withdrawn, a quantity of powder in the container will be withdrawn and exposed in the compartment open at the top, whereby it may be readily used.

3. A vanity case of the character described, including a casing having a container substantially filling one half thereof and extending from one side to the other, said container having an opening in the top, a slide closure for said opening and a snap catch for normally holding said slide closure closed, said container having one wall spaced above the bottom of the casing, a slide arranged in the bottom of the casing, and of a thickness to slide through said opening, said tray having a depressed portion, and a hand operated member for actuating the tray so that it may be forced through said opening into the container and withdrawn therefrom.

WILLIAM G. KENDALL.